United States Patent

Smith et al.

[11] Patent Number: 6,083,584
[45] Date of Patent: Jul. 4, 2000

[54] PERIMETER SEALS FOR MULTI-LAYER MATERIALS AND METHOD

[75] Inventors: Sidney T. Smith, Lake Forest; Steven H. Giovanetto, Vernon Hills, both of Ill.

[73] Assignee: Baxter International Inc., Deerfield, Ill.

[21] Appl. No.: 09/016,236

[22] Filed: Jan. 30, 1998

[51] Int. Cl.$^7$ .................. A61B 19/00; B32B 7/04
[52] U.S. Cl. .................. 428/35.2; 428/192; 428/195; 428/200; 428/517; 428/518; 428/520; 604/403; 604/408; 383/107; 128/DIG. 24; 156/273.7
[58] Field of Search .................. 428/35.2, 35.5, 428/195, 200, 192, 517, 518, 520; 604/403, 408, 262, 410; 383/107, 109, 113, 114, 115; 128/DIG. 24; 156/272.2, 273.7

[56] References Cited

U.S. PATENT DOCUMENTS

| | | | |
|---|---|---|---|
| 2,422,676 | 6/1947 | Haman et al. | 156/554 |
| 3,307,549 | 3/1967 | Zackheim | 604/262 |
| 3,520,471 | 7/1970 | Faust | 604/410 |
| 3,768,724 | 10/1973 | Hill | 206/523 |
| 3,985,135 | 10/1976 | Carpenter et al. | 604/410 |
| 4,023,607 | 5/1977 | Jensen et al. | 383/127 |
| 4,072,089 | 2/1978 | Bosche | 493/164 |
| 4,234,026 | 11/1980 | Bayham | 604/408 |
| 4,367,742 | 1/1983 | Ornstein | 604/333 |
| 4,411,358 | 10/1983 | Bennwik et al. | 206/771 |
| 4,432,763 | 2/1984 | Manschot et al. | 604/262 |
| 4,439,192 | 3/1984 | Leurink | 604/408 |
| 4,497,857 | 2/1985 | Bonis | 428/35.2 |
| 4,507,123 | 3/1985 | Yoshida | 604/408 |
| 4,516,977 | 5/1985 | Herbert | 604/415 |
| 4,531,997 | 7/1985 | Johnston | 383/107 |
| 4,658,433 | 4/1987 | Savicki | 383/63 |
| 4,927,647 | 5/1990 | Bailey | 426/126 |
| 4,968,624 | 11/1990 | Bacehowski et al. | 435/283.1 |
| 4,976,707 | 12/1990 | Bodicky et al. | 604/408 |
| 5,205,650 | 4/1993 | Rasmussen | 383/107 |
| 5,209,573 | 5/1993 | Freeman | 383/109 |
| 5,259,844 | 11/1993 | Bilstad et al. | 604/408 |
| 5,306,269 | 4/1994 | Lewis et al. | 604/403 |
| 5,318,556 | 6/1994 | Avallone et al. | 604/410 |
| 5,342,345 | 8/1994 | Spencer | 604/408 |
| 5,423,421 | 6/1995 | Inoue et al. | 206/219 |
| 5,451,437 | 9/1995 | Insley et al. | 428/35.2 |
| 5,545,419 | 8/1996 | Brady et al. | 383/109 |
| 5,686,527 | 11/1997 | Laurin et al. | 525/66 |
| 5,786,010 | 7/1998 | Yannuzi, Jr. | 383/109 |
| 5,910,138 | 6/1999 | Sperko et al. | 604/408 |

FOREIGN PATENT DOCUMENTS

| | | |
|---|---|---|
| 0 675 053 A1 | 10/1995 | European Pat. Off. |
| 24 34 248 A1 | 2/1976 | Germany. |
| 649 058 A5 | 4/1985 | Switzerland. |

*Primary Examiner*—Rena L. Dye
*Attorney, Agent, or Firm*—Mark J. Buonaiuto; Joseph A. Fuchs

[57] ABSTRACT

A container (10) suitable for medical uses comprising a first planar member (18), a second planar member (22), a first seam (24) and a second seam (26). The first planar member (18) is of a multi-layered polymeric material and further comprises a first substrate (38) and a first layer (46). The first layer (46) is disposed on a portion of the first substrate (38) to separately define a first overlap area (58) and an adjacent first peripheral flange (62). The second planar member (22) is of a multi-layered polymeric material. The first seam (24) attaches a portion of the first overlap area (58) to the second planar member (22). The second seam (26) is spaced from the first seam (24) and attaches a portion of the first peripheral flange (62) to the second planar member (22).

49 Claims, 3 Drawing Sheets

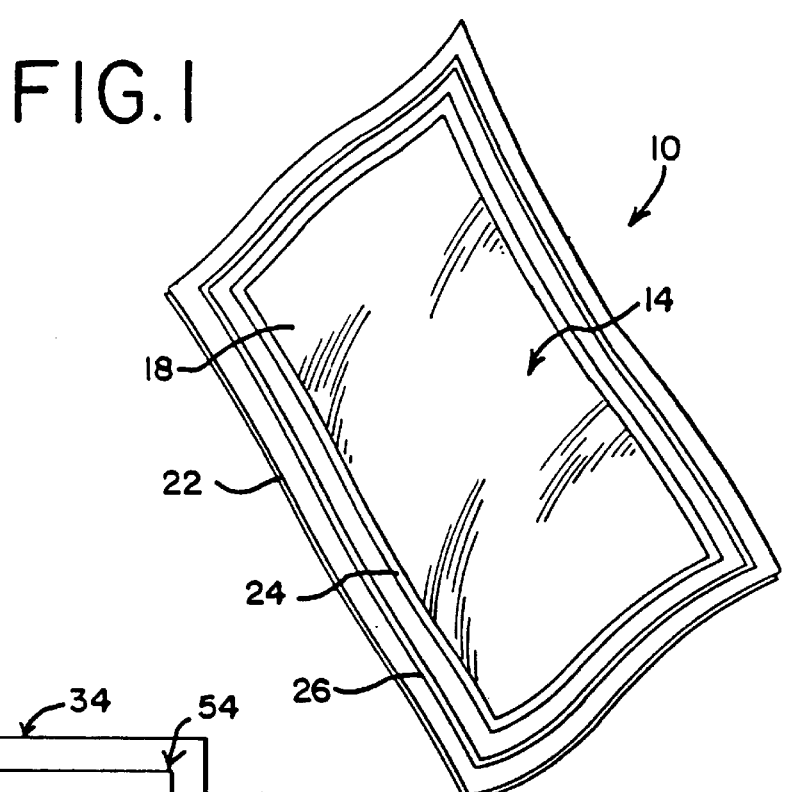
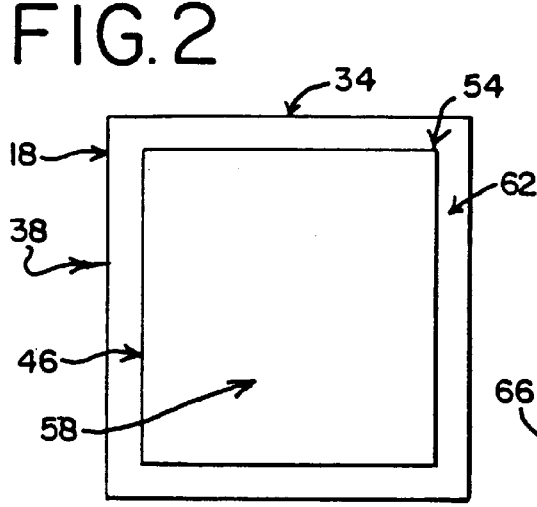
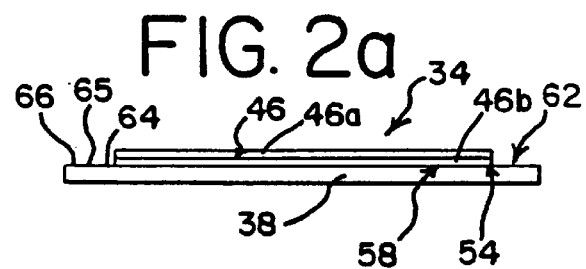
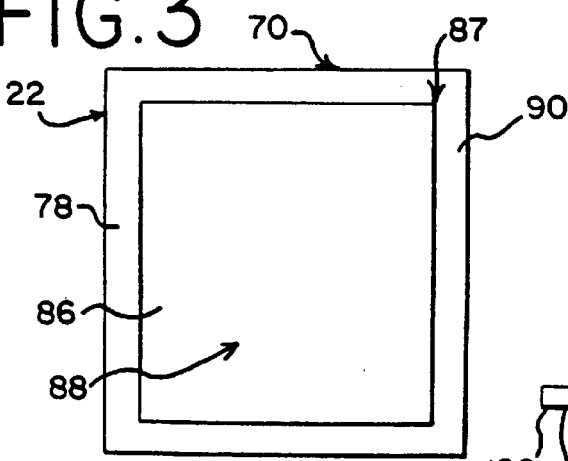
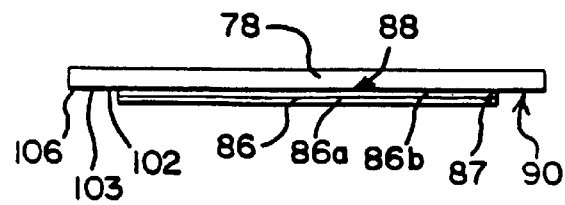

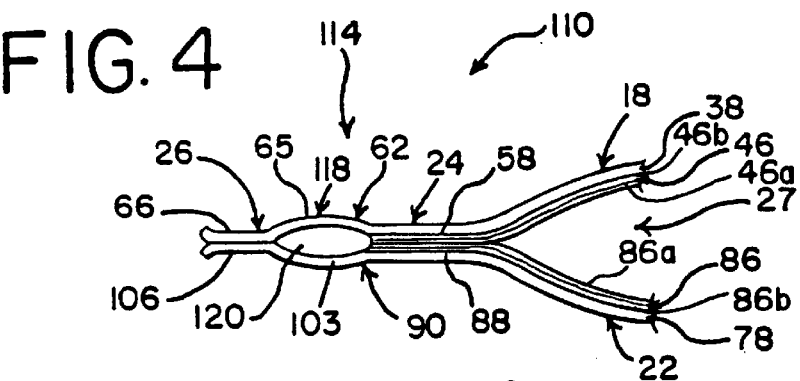
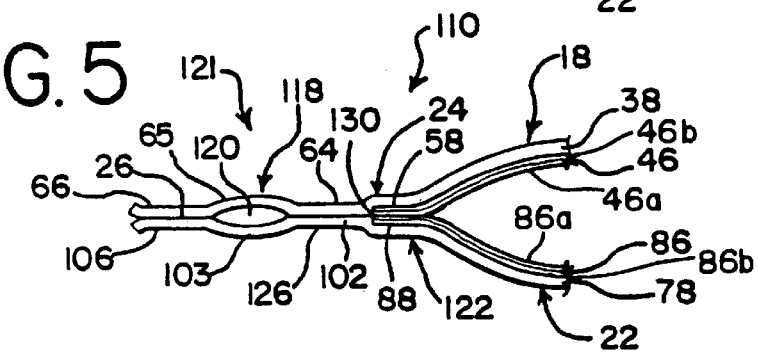
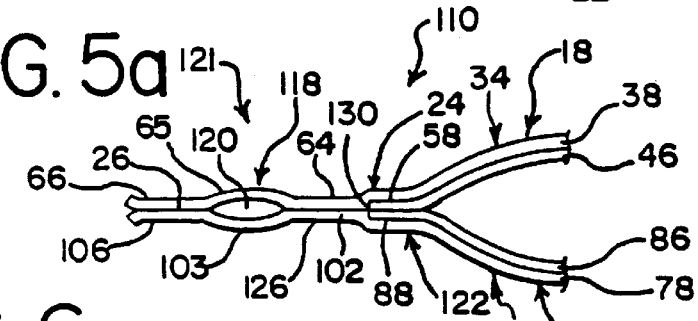
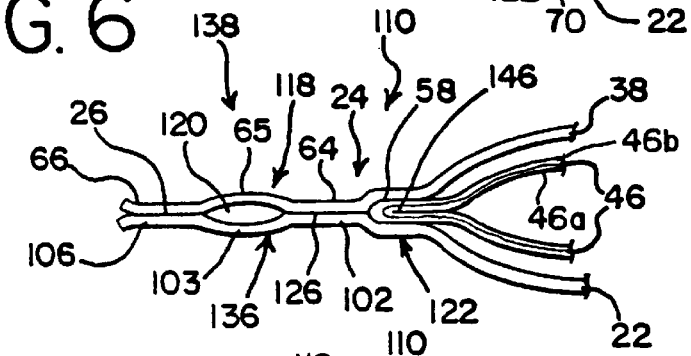
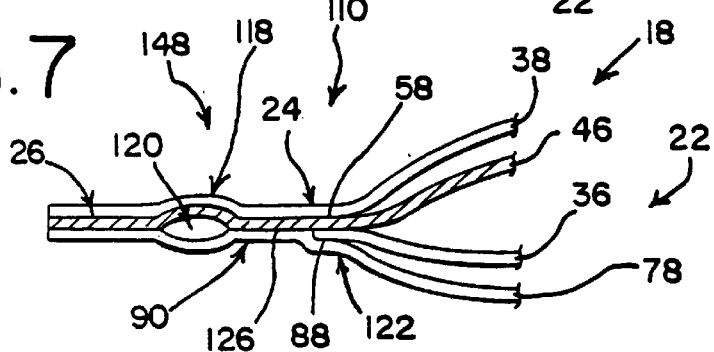

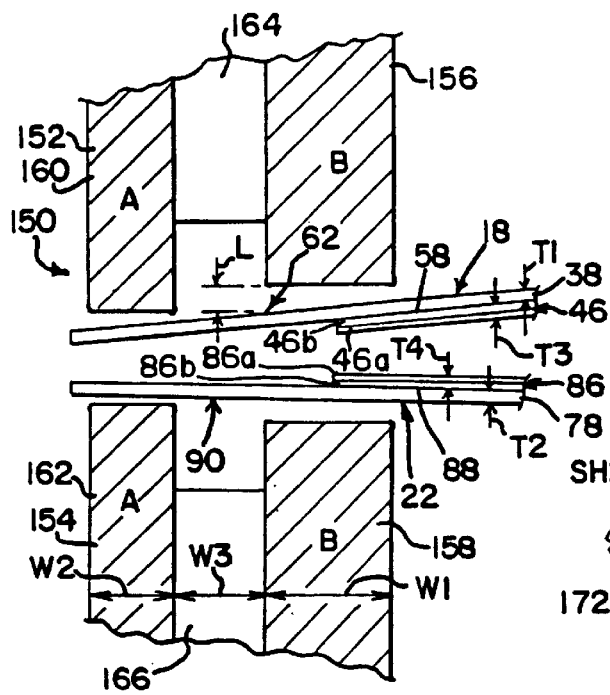
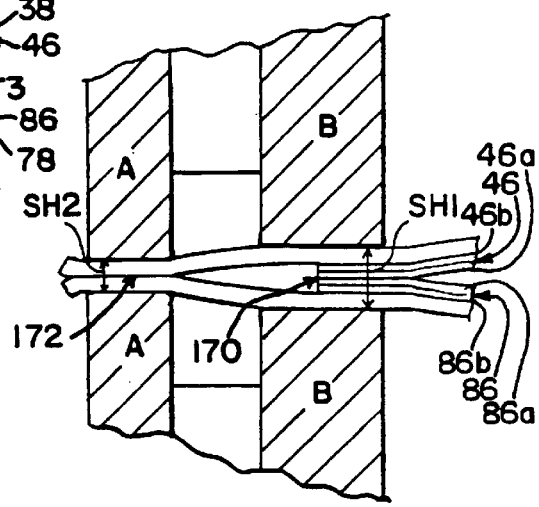
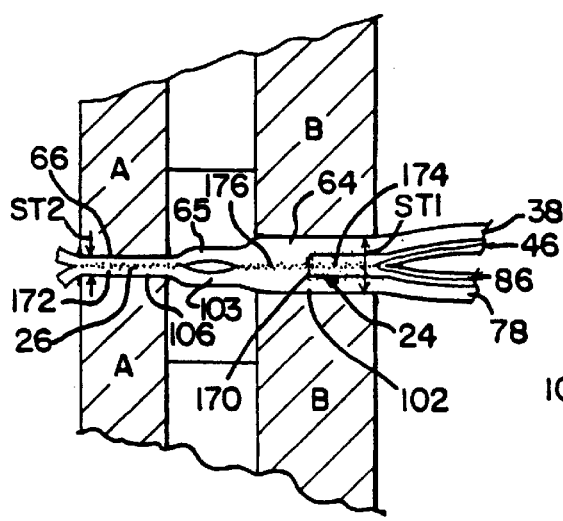
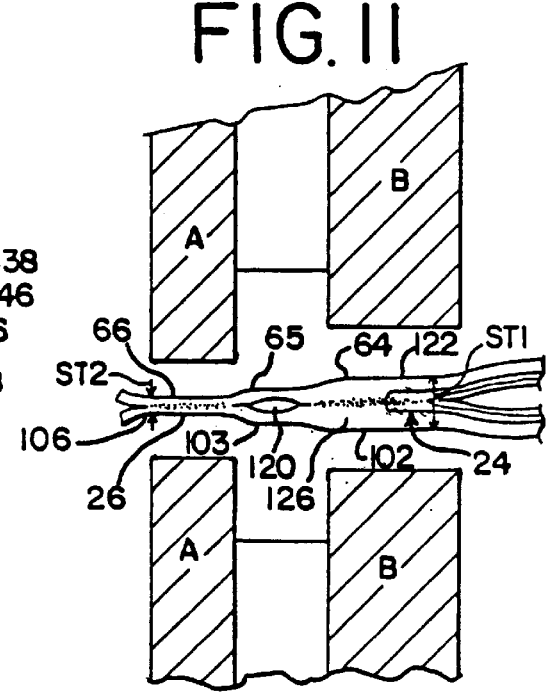

PERIMETER SEALS FOR MULTI-LAYER MATERIALS AND METHOD

TECHNICAL FIELD

The present invention relates to seal geometries for containers and, more specifically, seams used to seal containers constructed from multi-layered film materials.

BACKGROUND OF THE INVENTION

Containers used for the shipping, storing, and delivery of liquids, such as medical or therapeutic fluids, are often fabricated from single-ply or multi-ply polymeric materials Two sheets of these materials are placed in overlapping relationship and the overlapping sheets are bonded at their outer peripheries to define a chamber or pouch for containing liquids. It is also possible to extrude these materials as a tube and to seal longitudinally spaced portions of the tube to define chambers between two adjacent seals. Typically, the materials are joined along their inner surfaces using bonding techniques such as heat sealing, radio-frequency sealing, thermal transfer welding, adhesive sealing, solvent bonding, sonic sealing, and laser welding.

For most applications, the seal formed must be of sufficient strength to withstand the stresses generated by transporting, dropping, or agitating the liquid-filled container. Problems have been encountered with certain materials that do not bond well with themselves or other materials.

Problems have been encountered in forming strong seals in containers having sidewalls made of a layered material. Such a container is described in copending and commonly assigned U.S. patent application Ser. No. 08\330,717, and is constructed of a multi-layered polymeric material having an outer layer of a polymer blend of styrene-ethylene-butene-styrene ("SEBS") block copolymer (40%–85% by weight), ethylene vinyl acetate (0–40% by weight), and polypropylene (10%–40% by weight) and an inner layer of a polystyrene. The polystyrene layers face one another on the interior of the container and are welded together. However, the bond between the polystyrene layers was not sufficiently strong to allow the container to be centrifuged at useful speeds without bursting and could not be dropped at heights of above six feet without the seals failing.

Some medical containers can contain a relatively large quantity of fluids (1–2 liters), i.e., large volume containers. As the fluid volume increases in the container, so does the hydraulic forces of the fluid. In instances where the containers are filled prior to transporting them to the end user, hydraulic forces can cause the seals' to fail. Similarly, when a medical container of this type is dropped, tearing along the sealed portion can develop when the hydraulic forces exceed the tear initiation force limit of the seal. The tear can propagate along the seam, upon the application of forces well below the tear initiation force, until the container bursts. Thus, a container may not burst upon dropping, but may do so upon handling afterward.

A method designed to improve seal strength is disclosed in U.S. Pat. No. 4,968,624 issued to Bacehowski et al. and assigned to Baxter International Inc. ("Bacehowski"). Bacehowski discloses a medical container having two peripheral seals in horizontal spaced relationship. Sidewalls of the container are fabricated from a multi-ply material with uniform ply thickness across the sidewalls. This structure increases the burst strength of the container. However, Bacehowski does not provide a method for bonding materials that have varying ply thicknesses across the film.

Due to the problems relative to sealing containers manufactured from multi-layered materials, there is a need for creating a suitably strong peripheral seam in such containers.

SUMMARY OF THE INVENTION

The present invention relates to containers and a method for sealing multi-layered materials whose inner layers are incapable of forming sufficiently strong seals using current sealing techniques. This method for sealing multi-layered containers can be used to form containers, seal access ports into the containers, and to provide a multi-chambered container having a strong peripheral seam.

In the first embodiment of the present invention, a container suitable for medical uses comprises a first planar member, a second planar member, a first seam, and a second seam. The first planar member is produced from a first multi-layered polymeric material. This multi-layered polymeric material comprises a first substrate and a first layer. The first layer is disposed on a portion of the first substrate to separately define a first overlap area and a first peripheral flange. The first peripheral flange extends from the first overlap area.

The first seam includes the union of a portion of the first overlap area to the second planar member. The second seam is spaced from the first seam and includes the union of a portion of the first peripheral flange to the second planar member.

In another embodiment, the second planar member comprises a second multi-layered polymeric material and preferably of the same material as the first planar member. Accordingly, the second multi-layered polymeric material comprises a second substrate and a second layer. The second layer is disposed on a portion of the second substrate. This joining of the second substrate and the second layer separately defines a second overlap area and a second peripheral flange. The second peripheral flange extends from the second overlap area.

In this embodiment, the first seam includes the union of a portion of the first overlap area to a portion of the second overlap area. The second seam is separate from the first seam and includes the union of a portion of the first peripheral flange to a portion of the second peripheral flange.

In yet another embodiment, the container comprises a first planar member of a first multi-layered polymeric material, a second planar member of a second multi-layered polymeric material, a first seam, a spacer seam, and a second seam. Here, the first seam comprises a linking section and a bonding section. The linking section attaches an outer portion of the first overlap area with an outer portion of the second overlap area. Accordingly, the linking section has a four-ply thickness. In another embodiment, the first and second layers each comprise two layers wherein each overlap area comprises three layers. Thus, in this embodiment, the linking section has a six-ply thickness. The bonding section attaches an inner portion of the first peripheral flange with an inner portion of the second peripheral flange. This joining of the inner portions of the first and second peripheral flanges produces a two-ply thickness.

The spacer seam separates the first seam from the second seam. The spacer seam defines a chamber formed between an intermediate portion of the first peripheral flange and an intermediate portion of the second peripheral flange.

The second seam is preferably located proximate to the outer perimeter of the sealed portion of the container. Similar to the bonding section of the first seam, the second seam includes the union of portions of the first and second planar members. In particular, the second seam includes the union of an outer portion of the first peripheral flange to an outer portion of the second peripheral flange. Like the bonding section of the first seam, the second seam comprises a two-ply thickness.

According to another aspect of the invention, a method is provided for sealing planar members together such as multi-layered polymeric films to form a medical container. A first planar member is provided having a first layer on a first substrate wherein peripheral edges of the first layer are located inwardly of peripheral edges of the first substrate. The peripheral edges of the first substrate define a first peripheral flange. A second planar member is also provided having a second layer on a second substrate wherein peripheral edges of the second layer are located inwardly of peripheral edges of the second substrate. The peripheral edges of the second substrate define a second peripheral flange. The planar members are positioned in opposed relation wherein the first layer confronts the second layer to define and first interface area and the first peripheral flange confronts the second peripheral flange to define a second interface area. A welding apparatus is provided having a die. The first and second interface areas are placed in the welding apparatus, and the die is activated to compress the planar members in the interface areas. Sealing energy is applied through the die forming a welded seam in the first interface area and a welded seam in the second interface area.

According to a further aspect of the invention, the first interface area includes the area where the first welded seam is formed and further includes the linking section and the bonding section of the first welded seam. The second interface area includes the area where the second welded seam is formed and further includes the outer portions of the peripheral flanges.

According to yet a further aspect of the invention, the welding die comprises a first pair of welding dies and a second pair of welding dies. The first interface area is positioned between the first welding dies and the second interface area is positioned between the second welding dies. The welding dies are activated to compress the first interface area to a first compression ratio and to compress the second interface area to a second compression ratio wherein the first compression ratio is substantially equal to the second compression ratio.

Other advantages and aspects of the present invention will become apparent upon reading the following description of the drawings and detailed description of the invention.

BRIEF DESCRIPTION OF THE DRAWINGS

FIG. 1 is a perspective view of a medical fluid container of the present invention;

FIG. 2 is a plan view of a multi-layered planar member used to construct a container wall;

FIG. 2*a* is a side elevational view of the multi-layered planar member of FIG. 2;

FIG. 3 is a plan view of another multi-layered planar member used to construct another container wall;

FIG. 3*a* is a side elevational view of the multi-layered planar member of FIG. 3;

FIG. 4 is an enlarged partial cross-sectional view of an outer peripheral edge of the container sealed in accordance with one aspect of the invention;

FIG. 5 is an enlarged partial cross-sectional view of an outer peripheral edge of the container sealed in accordance with another aspect of the invention;

FIG. 5*a* is an enlarged partial cross-sectional view of an outer peripheral edge of the container sealed in accordance with another aspect of the invention;

FIG. 6 is an enlarged partial cross-sectional view of an outer peripheral edge of the container sealed in accordance with another aspect of the invention;

FIG. 7 is an enlarged partial cross-sectional view of an outer peripheral edge of the container sealed in accordance with another aspect of the invention;

FIG. 8 is an enlarged partial cross-sectional view showing outer peripheral edges of the planar members between pairs of welding dies, where the dies are open;

FIG. 9 is an enlarged partial cross-sectional view of the outer peripheral edges between the dies where the dies are partially closed but not compressing the planar members;

FIG. 10 is an enlarged partial cross-sectional view of the outer peripheral edges between the dies where the dies are closed; and, FIG. 11 is an enlarged partial cross-sectional view of the outer peripheral edges of the planar members sealed in accordance with the present invention.

DETAILED DESCRIPTION

While this invention is susceptible of embodiments in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Referring to the drawings, FIG. 1 shows a container made in accordance with the present invention generally referred to with the reference numeral 10. The interior workings of the container 10 is sealed from outside elements. Exterior portions 14 of the container 10 are defined by a first wall, or first planar member 18 and an opposing second wall, or second planar member 22 connected together along first and second horizontally spaced seams 24, 26 to form a fluid-tight compartment 27 (See FIG. 4). The container 10 shown in FIG. 1 is generally rectangular in shape, but can be formed to other shapes without departing from the invention.

As shown in FIG. 2, in one embodiment of the invention, the first planar member 18 includes a first multi-layered material 34. FIG. 2*a* shows the first multi-layered material 34 has three plies. The first ply is a first substrate 38 of the first planar member 18 and defines one exterior wall of the container 10. The second and third plies form a first layer 46 of the first planar member 18 and the innermost surface defines one interior wall of the container 10. The first layer 46 itself is a multi-layered structure having an inner layer 46*a* and an intermediate layer 46*b*. The inner layer 46*a* defines the inner wall of the container 10 and the intermediate layer 46*b* is adhered to the first substrate 38. As will be described in greater detail below, the first layer 46 is preferably formed by coextruding the inner layer 46*a* and the intermediate layer 46*b*. The first layer 46 is preferably centrally disposed on a portion 54 of the first substrate 38 to define separately a first overlap area 58 and a first peripheral flange 62 extending from the first overlap area 58. In this embodiment, the first peripheral flange 62 circumscribes the first overlap area 58; however, as will be described below, in an alternative embodiment, the first peripheral flange 62 does not surround the first overlap area 58 on all sides. The first layer 46 is heat-welded to the first substrate 38 at opposite peripheral edges of the intermediate layer 46*b* of the first layer 46. Although not required, the intermediate layer 46b is preferably made from the same material as the first substrate 38.

The first peripheral flange 62 preferably forms the outer perimeter of the first wall 18 and is the portion of the first wall 18 that is used for joining the first wall 18 to the other components of the container 10. As further shown in FIG. 2a, the first peripheral flange 62 further comprises an inner portion 64, an intermediate portion 65 and an outer portion 66. The purposes of the first peripheral flange portions 64,65,66 will become apparent upon further description. It will also be understood that the length of the first peripheral flange 62 can vary depending on the desired seal geometry.

In one embodiment, the second wall, or second planar member 22 comprises a first polymeric material. In this embodiment, the second planar member 22 is a single ply sheet. In the preferred embodiment, the second planar member 22, shown in FIGS. 3 and 3a, is produced from a second multi-layered polymeric material and preferably of the same materials as the first planar member 18. Similar to the first multi-layered polymeric material 34, the second multi-layered polymeric material 70 comprises a three-ply structure. The first ply is a second substrate 78 which defines an opposing exterior wall of the container 10. The second and third plies form a second layer 86 that defines an opposing interior wall of the container 10. The second layer 86 itself is a multi-layered structure having an inner layer 86a and an intermediate layer 86b. The inner layer 86a defines the inner wall of the container 10 and the intermediate layer 86b is adhered to the first substrate 38. As will be described in greater detail below, the second layer 86 is preferably formed by coextruding the inner layer 86a and the intermediate layer 86b. The second layer 86 is preferably centrally disposed on a portion 87 of the second substrate 78 to define separately a second overlap area 88 and a second peripheral flange 90 extending from the second overlap area 88. The second layer 86 is heat-welded to the second substrate 78 at opposite peripheral edges of the intermediate layer 86b of the second layer 86. Although not required, the intermediate layer 86b is preferably made from the same material as the second substrate 78.

FIGS. 3 and 3a show the second layer 86 centrally disposed on a portion of the second substrate 78. The second peripheral flange 90 preferably defines an outer perimeter of the second wall 22. Similar to the first peripheral flange 62, the second peripheral flange 90 further comprises an inner portion 102, an intermediate portion 103 and an outer portion 106. The purposes of the second peripheral flange portions 102,103,106 will become apparent upon further description. Similar to the first peripheral flange 62, the second peripheral flange 90 can also vary in length and is usually the same length as the first peripheral flange.

Preferably, during the construction of the container 10, the second layer 86 on the second substrate 78 is positioned in registry with the first layer 46 on the first substrate 38 so that when the container 10 is fully formed, the first layer 46 and the second layer 86 define the interior walls of the container 10 and the first substrate 38 and second substrate 78 form the exterior walls of the container 10.

The first planar member 18 and the second planar member 22 are generally produced from a first and second multi-layered polymeric material 34, 70 respectively. The polymeric materials employed to construct the first and second multi-layered material 34 and 70 may be of any flexible polymeric material including PVC, polyolefins and polyolefin alloys. Suitable polyolefin alloys include those disclosed in commonly assigned U.S. patent Ser. No. 08\153,823, which is incorporated herein by reference and made a part hereof. For example, it may be desirable to use multiple component polymer alloys, such as a 3–5 component polymer alloys that are RF responsive or RF susceptible. What is meant by RF susceptible is that the material will have a dielectric loss when excited with a signal having a frequency between 1 and 60 MHz, and between the temperature range of 25–250° C., greater than or equal to 0.05 and more preferably greater than or equal to 0.1.

One three component polymer alloy that is RF responsive, the first component will confer heat resistance and flexibility to the composition. This component may be selected from the group consisting of amorphous polyalpha olefins and preferably is a flexible polyolefin. These polyolefins should resist distortions to high temperatures up to 121° C., having a peak melting point of greater than 130° C. and be highly flexible, having a modulus of not more than 20,000 psi. Such a flexible polyolefin is sold under the product designation Rexene FPO 90007 which has a peak melting point of 145° C. and a modulus of 11,000 psi. In addition, certain polypropylenes with high syndiotacticity also possess the properties of high melting point and low modulus. The first component should constitute from 40–90% by weight of the composition.

The second component of the three component composition is an RF susceptible polymer which confers RF sealability to the composition and may be selected from either of two groups of polar polymers. The first group consists of ethylene copolymers having 50–85% ethylene content with at least one comonomer selected from the group consisting of acrylic acid, methacrylic acid, ester derivatives of acrylic acid with alcohols having 1–10 carbons, ester derivatives of methacrylic acid with alcohols having 1–10 carbons, vinyl acetate, and vinyl alcohol. The RF susceptible polymer may also be selected from a second group consisting of polymers and copolymers containing at least one monomer or segment of urethane, ester, urea, imide, sulfone, and amide. These functionalities may constitute between 5–100% of the RF susceptible polymer. The RF susceptible polymer should constitute by weight from 5–50% of the composition. Preferably, the RF component is copolymers of ethylene methyl acrylate with methyl acrylate within the range of 15–25% by weight of the polymer.

The final component of the three component compound confers compatibility between the first two components, and is selected from a styrene and hydrocarbon block copolymer and more preferably a styrene-ethylene-butene styrene block copolymer (SEBS), styrenic block copolymers and most preferably a SEBS block copolymer that is maleic anhydride functionalized. The third component should constitute by weight within the range of 5–30% of the composition.

In a second three component polymer alloy, the first component confers RF sealability and flexibility over the desired temperature range. The first component confers high temperature resistance ("temperature resistant polymer") and is chosen from the group consisting of polyamides, polyimides, polyurethanes, polypropylene and polymethylpentene. Preferably the first component constitutes by weight within the range of 30–60% of the composition, and preferably is polypropylene. The second component confers RF sealability and flexibility over the desired temperature range. The RF polymer is selected from the first and second groups identified above with the exception of ethylene vinyl alcohol. The second component should constitute by weight within the range of 30–60% of the composition. The third component ensures compatibility between the first two components and is chosen from SEBS block copolymers and preferably is maleic anhydride functionalized. The third component should constitute within the range of 5–30% by weight of the composition.

As for four and five component polymer alloys that are RF responsive, the first component confers heat resistance. This component may be chosen from polyolefins, most preferably polypropylenes, and more specifically the propylene alpha-olefin random copolymers (PPE). Preferably, the PPE's will have a narrow molecular weight range. However, by themselves, the PPE's are too rigid to meet the flexibility requirements. When combined by alloying with certain low modulus polymers, good flexibility can be achieved. Examples of acceptable PPE's include those sold under the product designations Soltex 4208, and Exxon Escorene PD9272.

These low modulus copolymers can include ethylene based copolymers such as ethylene-co-vinyl acetate ("EVA"), ethylene co-alpha olefins, or the so-called ultra low density (typically less than 0.90 Kg/L) polyethylenes ("ULDPE"). These ULDPE include those commercially available products sold under the trademarks TAFMER® (Mitsui Petrochemical Co.) under the product designation A485, EXACT® (Exxon Chemical Company) under the product designations 4023–4024, and INSITE® technology polymers (Dow Chemical Co.). In addition, poly butene-1 ("PB"), such as those sold by Shell Chemical Company under product designations PB-8010, PB-8310; thermoplastic elastomers based on SEBS block copolymers, (Shell Chemical Company), poly isobutene ("PIB") under the product designations Vistanex L-80, L-100, L-120, L-140 (Exxon Chemical Company), ethylene alkyl acrylate, the methyl acrylate copolymers ("EMA") such as those under the product designation EMAC 2707, and DS-1130 (Chevron), and n-butyl acrylates ("ENBA") (Quantum Chemical) were found to be acceptable copolymers. Ethylene copolymers such as the acrylic and methacrylic acid copolymers and their partially neutralized salts and ionomers, such as PRIMACOR® (Dow Chemical Company) and SURYLN® (E.I. DuPont de Nemours & Company) were also satisfactory.

Preferably the first component is chosen from the group of polypropylene homo and random copolymers with alpha olefins which constitute by weight approximately 30–60%, more preferably 35–45%, and most preferably 45%, of the composition and any combination or subcombination of ranges therein. For example, random copolymers of propylene with ethylene where the ethylene content is in an amount within the range of 1–6%, and more preferably 2–4%, of the weight of the polymer is preferred as the first component.

The second component of the four component polymer alloy confers flexibility and low temperature ductility and is a second polyolefin different than that of the first component wherein it contains no propylene repeating units ("non propylene based polyolefin"). Preferably it is ethylene copolymers including ULDPE, polybutene, butene ethylene copolymers, ethylene vinyl acetate, copolymers with vinyl acetate contents between approximately 18–50%, ethylene methyl acrylate copolymers with methyl acrylate contents being between approximately 20–40%, ethylene n-butyl acrylate copolymers with n-butyl acrylate content of between 20–40%, ethylene acrylic acid copolymers with the acrylic acid content of greater than approximately 15%. An example of these products are sold under such product designations as TAFMER® A-4085 (Mitsui), EMAC DS-1130 (Chevron), Exact 4023, 4024 and 4028 (Exxon). More preferably, the second component is either ULDPE sold by Mitsui Petrochemical Company under the designation TAFMER A-4085, or polybutene-1, PB8010 and PB8310 (Shell Chemical Co.), and should constitute by weight approximately 25–50%, more preferably 35–45%, and most preferably 45%, of the composition and any combination or subcombination of ranges therein.

To impart RF dielectric loss to the four component composition, certain known high dielectric loss ingredients ("RF susceptible polymers") are included in the composition. These polymers may be selected from the group of RF polymers in the first and second group set forth above.

Other RF active materials include PVC, vinylidine chlorides, and fluorides, copolymer of bis-phenol-A and epichlorohydrines known as PHENOXYS® (Union Carbide). However, significant contents of these chlorine and fluorine containing polymers would render the composition environmentally unsound as incineration of such a material would generate inorganic acids.

The polyamides of the RF susceptible polymer are preferably selected from aliphatic polyamides resulting from the condensation reaction of di-amines having a carbon number within a range of 2–13, aliphatic polyamides resulting from a condensation reaction of di-acids having a carbon number within a range of 2–13, polyamides resulting from the condensation reaction of dimer fatty acids, and amides containing copolymers (random, block, and graft). Polyamides rarely are found in the layer which contacts medical solutions as they typically contaminate the solution by leaching out into the solution. However, it has been found by the Applicants of the present invention that the most preferred RF susceptible polymer are a variety of dimer fatty acid polyamides sold by Henkel Corporation under the product designations MACROMELT and VERSAMID, which do not lead to such contamination. Applicants have also had success with nylon, sold by Henkel under the name L-20. The RP susceptible polymer preferably should constitute by weight approximately 5–30%, more preferably between 7–13%, and most preferably 10%, of the composition and any combination or subcombination of ranges therein.

The fourth component of the composition confers compatibility among the polar and nonpolar components of the composition (sometimes referred to as a "compatibilizing polymer") and preferably is styrenic block copolymers with hydrocarbon soft segments. More preferably, the fourth component is selected from SEBS block copolymers that are modified by maleic anhydride, epoxy, or carboxylate finctionalities, and preferably is an SEBS block copolymer that contains maleic anhydride functional groups ("functionalized"). Such a product is sold by Shell Chemical Company under the designation KRATON® RP-6509. The compatibilizing polymer should constitute by weight approximately 5–40%, more preferably 7–13%, and most preferably 10% of the composition and any combination or subcombination of ranges therein.

It may also desirable to add a fifth component of a nonfunctionalized SEBS block copolymer such as the ones sold by Shell Chemical Company under the product designations KRATON G-1652 and G-1657. The fifth component should constitute by weight approximately 5–40%, and more preferably 7–13% and any combination or subcombination of ranges therein.

The preferred polymer alloy is a blend of styrene-ethylene-butene-styrene ("SEBS") block copolymer (40%–85% by weight), ethylene vinyl acetate ("EVA")

(0–40% by weight), and polypropylene (10%–40% by weight). More preferably, the blend is 60% by weight SEBS, 20% by weight EVA and 20% by weight polypropylene. This blend is described in detail in commonly-assigned U.S. Pat. No. 4,140,162, which is incorporated in its entirety herein by reference and made a part hereof A representative blend is sold by Baxter Healthcare under the trademark PL-732®.

In a preferred embodiment, and as described in an example below, the first layer 46 comprises a coextruded multi-layered material wherein the inner layer 46*a* is polystyrene and the intermediate layer 46*b* is PL-732® as described above. The first substrate 38 is also made from PL-732°. Thus, two of the plies of the multi-layered material 34 are of the same material, PL-732°. Similarly, the second layer 86 comprises a coextruded multi-layered material wherein the inner layer 86*a* is polystyrene and the intermediate layer 86*b* is PL-732°. The second substrate 78 is also made from PL-732°. It is contemplated, however, that the first layer 46 and the second layer 86 can each be single plies, or single layers. The single ply first and second layers 46,86 could comprise any number of materials including polystyrene. It is further contemplated that the first substrate 38, first layer 46, second substrate 78 and second layer 86 can all comprise multiple layers themselves. Thus, the present invention contemplates any number of layers wherein there is a different number of layers across the entire multi-layered web of material 34,70, and sealed as described below.

FIG. 5*a* shows one example wherein the first multi-layered material 34 comprises two plies. The first substrate 38 is a single-ply and preferably made from PL-732®. The first layer 46 is a single-ply and preferably made from polystyrene. Similarly, the second multi-layered material 70 comprises two plies. The second substrate 78 is a single-ply and preferably made from PL-732°. The second layer 86 is a single-ply and preferably made from polystyrene. The materials 34,70 are then sealed in accordance with the invention as described below.

Preferably, the multi-layered polymeric materials allow for strong bonds to form between the first and second substrates 38, 78 and the first and second layers 46, 86. The first and second substrates 38, 78 are produced to a thickness of about 0.004 inches to about 0.012 inches, more preferably 0.005 to about 0.010 inches, and most preferably 0.006 inches to about 0.008 inches, or any range or combination of ranges therein. The first and second substrates 38, 78 are generally bonded using conductive, inductive, or other common sealing techniques.

The inner layers 46*a*,86*a* of the first and second layers 46, 86, which define the interior of the container 10, are produced from a second polymeric material. This polymeric material is suitable for serving as a cell culture growth surface and preferably has a thickness of 0.0001 inches to about 0.0010 inches, more preferably 0.0002 inches to about 0.0006 inches, and most preferably about 0.0003 inches, or any range or combination of ranges therein. The first and second layers 46, 86 may also be any material that is appropriate for the first and second substrates 38 and 78 respectively. As discussed, in a preferred embodiment, the first and second layers 46,86 each comprise a polystyrene layer (inner layers 46*a*,86*a*) coextruded on a PL-732® layer (intermediate layers 46*b*,86*b*).

FIG. 4 shows a partial cross-sectional view of a perimeter 110 of the container 10 of one embodiment of the invention. A seal 114 comprises the first seam 24, a spacer seam 118, and the second seam 26. This seal 114 improves the impact resistance of the container 10 by increasing the container's ability to withstand hydraulic shock and consequential rupture of the container side walls 18,22 that can occur upon dropping or otherwise impacting upon a liquid filled container.

In FIG. 4, the first seam 24 is defined by the union of the first overlap area 58 with the second overlap area 88. The spacer seam 118 defines a chamber 120. The chamber 120 is formed by non-sealed portions of the inner and/or intermediate portions 64,65,102,103 of the first and second peripheral flanges 62 and 90. The second seam 26 lies farther toward the outer periphery of the perimeter 110 than the first seam 24. The second seam 26 joins portions of the outer portions 66,106 of the first and second peripheral flanges 62 and 90.

FIG. 5 shows another embodiment of the present invention having a seal 121 in the perimeter 110 of the container 10. The first seam 24 of the seal 121 includes a linking section 122 and a bonding section 126. The length of the linking section 122 in relation to that of the bonding section 126 can be varied greatly. In one embodiment, the length of the linking section 122 is approximately equal to the length of the bonding section 126. Of course the present invention contemplates any ratio of length between the linking section 122 and bonding section 126.

As further shown in FIG. 5, the linking section 122 has a six-ply thickness. Accordingly, the linking section 122 joins the first overlap area 58 of the first wall 18 with the second overlap area 88 of the second wall 22. This union is generally accomplished through the use of heat and/or compression supplied by a mechanical dies as will be described below. Other sealing techniques may also be employed such as applying a bonding agent or tie layer to one or all of the components within the linking section 122 to form a seal.

Moving toward the outer periphery of the perimeter 110 of the container 10, the bonding section 126 is defined by the union of the inner portion 64 of the first peripheral flange 62 with the inner portion 102 of the second peripheral flange 90. At a transition point 130, the linking section 122 and the bonding section 126 cooperate to pinch and seal the first layer 46 with the second layer 86. The seal provided at this transition point 130 is sufficiently strong and durable to withstand internal and external forces which may lead to delamination along this area.

The bonding section 126 has a two-ply thickness. Like the linking section 122, the bonding section 126 may be sealed through the use of heat and/or compression supplied by a mechanical die; however, other means of joining these components may be utilized without departing from the invention.

Moving farther toward the outer periphery of the perimeter 110 of the container 10, the spacer seam 118 separates the bonding section 126 from the outer or second seam 26. Again, the spacer seam 118 defines the chamber 120. Here, the chamber 120 is formed near the center of the spacer seam 118 and is characterized by non-sealed portions of the intermediate portions 65,103 of the first and second peripheral flanges 62,90. The present invention contemplates the elimination of the chamber 120 thereby having a direct link between the bonding section 126 and the second seam 26.

As further shown in FIG. 5, the second seam 26 is positioned adjacent the outer periphery of the perimeter 110 of the container 10. The outer portion 66 of the first peripheral flange 62 and the outer portion 106 of the second peripheral flange 90 are joined to form the second seam 26. In the preferred embodiment, the second seam 26 has a two-ply thickness, and the seal created in the second seam 26 can be formed in a manner similar to other seals created within the seal 121.

FIG. 6 illustrates an alternative seal 138 in cross-section. In this embodiment, the first seam 24 comprises a portion of the first overlap area 58, a continuous portion 146 of the first layer 46, and a portion of the second wall 22. Here, the continuous portion 146 is formed by folding the first layer 46 onto itself. The continuous portion 146 is then sealed in the first seam 24 with a portion of the first overlap area 58 and a portion of the second wall 22.

The seal 138 disclosed in FIG. 6 would be particularly useful in sealing a multi-layered polymeric material produced in a tubular form. Such a tubular form is manufactured by coextrusion. The tube can be manufactured through a conventional coextruder die to produce a tube useful in connection with the present invention. The tube can be formed into a container by sealing longitudinally spaced portions of the tube to define a fluid-tight chamber therebetween.

Another embodiment of a seal 148 is disclosed in FIG. 7. In this embodiment, the linking section 122 comprises the first overlap area 58 and the second overlap area 88. Here, the linking section 122 is a four-ply thickness. Further to this embodiment, the bonding section 126, the spacer seam 118, and the second seam 26 comprise three-ply thicknesses. These portions of the seal 148 are formed by joining the first overlap area 58 with the second peripheral flange 90. In this embodiment, the first peripheral flange 62 and the second peripheral flange 90 do not circumscribe the first and second walls 18, 22 respectively. Here, the first and second walls 18, 22 exhibit these flange portions on outer opposing edges. This embodiment, allows continuously extruded multi-layered polymeric walls to be joined to form a medical container 10 suitable for cell culture growth.

An advantage of the embodiment disclosed in FIG. 7 is that the need for the stripping process, as described above, is lessened. In this embodiment, rather than stripping a layer around the perimeter of the sheet, only two parallel sides of the sheet must be stripped. One sheet is then rotated 90°, and the container is then assembled using the seal 138. Moreover, stripping can be completely eliminated when a sheet of multi-layered material is extruded with the striped second layer present from end-to-end but not side-to-side. One wall can then be rotated 90°, and the container can be assembled using the seal 138.

FIGS. 8–11 disclose the method of making the container 10 shown in FIGS. 1–7 wherein a seal having multiple seams is formed along the outer perimeter 110 of a pair of opposed films having multiple layers. The method contemplates the use of a welding apparatus having a welding die. The operation of the die is typical of those found in industry. The die, however, is shaped in a unique configuration to produce the welded seams of the present invention and to achieve substantially equal compression when sealing planar members having various ply thicknesses across their surfaces. The welding die structure will first be described and then the process of making the container 10 will be described.

FIG. 8 shows a welding die 150 of the present invention. The welding die 150 comprises a pair of mating parts 152,154 used in the sealing process. It is of course possible to use a single die without departing from the spirit of the invention. In a preferred embodiment, the welding die 150 comprises a first pair of mating welding dies 156,158 and a second pair of mating welding dies 160,162. The first pair of welding dies 156,158 are each designated "B." The second pair of welding dies 160,162 are each designated "A." In the preferred embodiment, the dies 156,160 of mating part 152 are separated by a spacer bar 164 and the dies 158,162 of the mating part 154 are separated by a spacer bar 166. The dies of each mating part 152,154 could be integrally attached or separated without the use of the spacer bars 164,166 if desired. The break or space between the "B" dies and the "A" dies allows greater manufacturing tolerances for alignment of the dies 156,158,160,162 with the planar members 18,22 that form the container 10 during the sealing process.

The width W1 of the first pair of dies 156,158 is preferably in the range of 10 in.–0.40 in. and most preferably the width W1 is 0.25 in. The width W2 of the second pair of dies 160,162 is preferably in the range of 0.04 in.–0.20 in. and most preferably the width W2 is 0.06 in. The width W3 of the bars 166,164 is preferably in the range of 0.05 in.–0.20 in. and most preferably the width W3 is 0.06 in. Thus, the first pair of dies 156,158 are most preferably spaced from the second pair of dies 160,162 by 0.06 in. The widths W1,W2, W3 may vary depending on the desired construction of the container 10 as will be further described below. Finally, in each welding part 152,154, the die 156,158 designated "B" is vertically offset, or stepped, from the die 160,162 designated "A" by a distance L. The distance L may vary depending on the thickness of the substrates 38,78 and layers 46,86 used in the container 10. This aspect will be further described below.

Generally, to make a container 10 having a seal having a dual seam as described above, the first planar member 18 and second planar member 22 are positioned in opposed relation between the welding parts 152,154 of the welding die 150 (FIGS. 9 and 10). The overlap areas 58,88 of the planar members 18,22 preferably extend approximately half the width W1 of the first pair of dies 156,158 and the flanges extend from the first pair of dies 156,158 through the second pair of dies 160,162 (FIGS. 9 and 10). The welding parts 152,154 close and sealing energies are applied through the parts 152,154 (FIG. 10). The first pair of dies 156,158 form the first seam 24 and the second pair of dies form the second seam 26. The dies are then opened and a container 10 is formed having a seal with dual seams (FIG. 11).

Specifically, before commencing the process of the present invention, certain parameters must first be determined to configure the welding die 150 appropriately to form the container 10 based on the materials used for the planar members 18,22. First, as shown in FIG. 8, the thicknesses of the substrates 38,78 and layers 46,86 of the planar members 18,22 are determined. The thickness of the first substrate 38 is designated as T1 and the thickness of the second substrate 78 is designated as T2. The thickness of the first layer 46 is designated as T3. The thickness T3 includes the respective thicknesses of the inner layer 46a and the intermediate layer 46b. The thickness of the second layer 86 is designated as T4. The thickness T4 includes the respective thicknesses of the inner layer 86a and the intermediate layer 86b. The thicknesses T1,T2 of the substrates 38,78 and thicknesses T3,T4 of the layers 46,86 determine the stack height (SH) of the combined plies between the dies in an uncompressed state (FIG. 9). Thus, as shown in FIG. 9, the stack height SH1 in the first pair of dies 156,158 comprises the thickness T1 of the first substrate 38, the thickness T3 of the first layer 46, the thickness T2 of the second substrate 78 and the thickness T4 of the second layer 86 (i.e. SH1=T1+ T2+T3+T4). The stack height SH2 in the second pair of dies 160,162 comprises the thickness T1 of the first substrate 38 and the thickness T2 of the second substrate 78 (i.e. SH2=T1+T2). It is understood that all of the thicknesses T1–T4 could vary. In a preferred embodiment, the thicknesses T1,T2 of the substrates 38,78 are equal and the thicknesses T3,T4 of the layers 46,86 are equal. A compression ratio is also selected. The compression ratio is the ratio between the initial stack height SH and a desired seam thickness ST (See FIG. 11) (CR=SH/ST). Typically, a compression ratio is initially selected so that other variables can then be calculated. A typical compression ratio may be 60%. After a compression ratio is selected, desired seam thicknesses can be calculated and the offset length L of the welding die 150 can be set accordingly.

Having the initial parameters set, the process can be commenced. First, as shown in FIG. 8, first planar member 38 and second planar member 78 are positioned in opposed relation. The first layer 46 confronts the second layer 86 to define a first interface area 170 wherein the inner layer 46a of the first layer 46 faces the inner layer 86a of the second layer 86. The first peripheral flange 62 of the first substrate 38 confronts the second peripheral flange 90 of the second substrate 78 to define a second interface area 172. The opposed planar members are placed between the welding parts 152,154 of the welding die 150 (FIG. 8). FIG. 9 shows the planar members 38,78 positioned between the welding parts 152,154 that are partially closed but wherein the planar members 38,78 are in an uncompressed state. In the preferred embodiment, the first interface area 170 is located between the first pair of dies 156,158, and the second interface area 172 is located between the second pair of dies 160,162. As further shown in FIG. 9, the first and second layers 46,86 extend approximately half the width W1 of the first pair of dies 156,158. The first and second peripheral flanges 62,90 extend from the first pair of dies 156,158 past the spacer bars 164,166 and through the second pair of dies 160,162. Specifically, as shown in FIG. 10, the inner portions 64,102 of the first and second peripheral flanges 62,90 are located proximately between the first pair of dies 156, 158; the intermediate portions 65,103 of the flanges 62,90 are located proximately between the spacer bars 164,166; and the outer portions 66,106 of the flanges 62,90 are located proximately between the second pair of dies 160,162.

As shown in FIG. 10, the welding die 150 is then activated wherein the first pair of dies 156,158 and the second pair of dies 160,162 compress the planar members 18,22 in the interface areas 170,172. Sealing energy is then applied through the dies 156,158,160,162 forming a first welded seam 24 in the first interface area 170 and a second welded seam 26 in the second interface area 172. Specifically, in a first segment 174 of the first interface area 170, the inner layer 46a of the first layer 46 is welded to the inner layer 86a of the second layer 86. In a second segment 176 of the first interface area 170, the inner portion 64 of the first peripheral flange 62 is welded to the inner portion 102 of the second peripheral flange 90. The intermediate portions 65,103 of the peripheral flanges 62,90 are not welded and cooperatively form the chamber 120. In the second interface area 172, the outer portion 68 of the first peripheral flange 62 is welded to the outer portion 106 of the second peripheral flange 90 to form the second welded seam 26.

As previously discussed, the first pair of dies 156,158 accommodate the first overlap area 58 and the second overlap area 88 comprising six layers at the stack height SH1. The second pair of dies 160,162 accommodate the outer portions 68,106 of the peripheral flanges 62,90 comprising two layers at the stack height SH2. If a conventional flat die was used in the process to form both the first welded seam 24 and the second welded seam 26 to a uniform seam thickness, the difference in stack heights could result in too much compression in the first interface area 170 and little or no compression in the second interface area 172. Thus, the dies 156,160 in the welding part 152 are vertically offset and the dies 158,162 are likewise vertically offset in the welding part 154. The dies 156,158,160,162 are vertically offset a distance L (FIG. 8) such that when the dies are activated as shown in FIG. 10, the dies 156,158 form the first welded seam 24 at a first seam thickness ST1 and the dies 160,162 form the second welded seam at a second seam thickness ST2. Because of the vertically offset distance L, the welded seam 24,26 are formed at substantially equal compression ratios. As discussed, the compression ratio is the ratio between the desired seam thickness ST and the initial stack height SH. Accordingly, the compression ratio CR1 (CR1== ST1/SH1) in the first interface area 170 is substantially equal to the compression ratio CR2(CR2=ST2/SH2) in the second interface area 172. The distance L will obviously vary depending on the desired seam thicknesses ST and the initial stack heights SH, or the compression ratio CR selected for the process. The distance L can be expressed by the formula: L=(SH1*CR−SH2*CR)/2. A typical compression ratio CR may be 60%. After the welded seams 24,26 are complete and the welding parts 152,154 are opened (FIG. 11). The container 10 is then formed and further attachments could also be affixed to the container 10.

In a preferred embodiment, the sealing energy applied through the dies 156,158,160,162 is heat energy. Other types of sealing energies could be applied, however, based on the materials used for the container 10. For example, sealing energies used in radio-frequency sealing, thermal transfer welding, sonic sealing, and laser welding could also be used.

It will be understood that FIGS. 8–11 are partial cross-sectional views and that the seams 24,26 are formed around a substantially full periphery of the container 10 with appropriate breaks to accommodate tube attachments as is well known. It is contemplated, however, that any number of sides of the container 10 can be sealed wherein only a portion of the periphery is sealed as described.

By way of example, and not limitation, an example of the present invention is now described illustrating the manufacture of the container 10. A first layer 46 was prepared by coextruding an inner layer 46a of polystyrene and an intermediate layer 46b of PL-732. The polystyrene layer had a thickness of 0.0003 in., and the PL-732 had a thickness of 0.008. A first substrate 38 was provided and made from PL-732 having a thickness of 0.010 in. The first layer 46 was welded to a central portion of the first substrate 38. Similarly, a second layer 86 was prepared by coextruding an inner layer 86a of polystyrene and an intermediate layer 86b of PL-732. The polystyrene layer had a thickness of 0.0003 in., and the PL-732 had a thickness of 0.008. A second substrate 78 was provided and made from PL-732 having a thickness of 0.010 in. The second layer 86 was welded to a central portion of the second substrate 78. The layers 46,86 and substrates 38,78 were placed in confronting relation between the welding die 150 wherein the inner layer 46a (polystyrene layer) of the first layer 46 faced the inner layer 86a (polystyrene layer) of the second layer 86. A compression ratio of 60% was selected and distance L set accordingly based on desired seam thicknesses. The welding die 150 was activated and the container 10 was formed. Containers 10 having a size of 180 square centimeters were manufactured and centrifuged with success. Under normal handling, the containers 10 did not rupture. Other containers 10 having sizes from 70 square centimeters to 1000 square centimeters were also successfully manufactured and were capable of containing liquids without rupturing under normal handling.

It is understood that, given the above description of the embodiments of the invention, various modifications may be made by one skilled in the art. Such modifications are intended to be encompassed by the claims below.

What is claimed is:

1. A container suitable for medical uses comprising:
   a first wall of a first multi-layered polymeric material, the first multi-layered material having a first substrate and a first layer disposed on a portion of the first substrate to define separately a first overlap area and a first peripheral flange adjacent the first overlap area, the first layer being disposed within the container;
   a second wall of a first polymeric material;
   a first seam attaching a portion of the first overlap area to the second wall; and,
   a second seam spaced from the first seam and attaching a portion of the first wall peripheral flange to the second wall.

2. The container of claim 1 wherein the second wall is of a second multi-layered polymeric material.

3. The container of claim 2 wherein the second multi-layered polymeric material comprises a second substrate and a second layer disposed on the second substrate separately defining a second overlap area and a second peripheral flange adjacent the second overlap area.

4. The container of claim 1 wherein the first layer is centrally disposed on the first substrate.

5. The container of claim 1 wherein the first substrate is of a multi-component polymeric blend.

6. The container of claim 4 wherein the first layer comprises an inner layer of polystyrene and an intermediate layer of a multi-component polymeric blend.

7. The container of claim 5 wherein the polymeric blend comprises a polypropylene, an ethylene copolymer, and a styrene and hydrocarbon copolymer.

8. The container of claim 1 wherein the first polymeric material is a polymeric blend.

9. The container of claim 1 wherein the first and second seams extend along a perimeter of the container.

10. The container of claim 1 wherein the first seam and the second seam are formed using heat and compression.

11. The container of claim 10 wherein a stepped die provides the heat and compression.

12. A container suitable for medical uses comprising:
    a first wall of a first multi-layered polymeric material, the first multi-layered material having a first substrate and a first layer disposed on a portion of the first substrate to define separately a first overlap area and a first peripheral flange adjacent the first overlap area the first layer being disposed within the container;
    a second wall of a second multi-layered polymeric material, the second multi-layered material having a second substrate and a second layer disposed on at least a portion of the second substrate to define separately a second overlap area and second peripheral flange adjacent the second overlap area, the second layer being disposed within the container;
    a first seam attaching a portion of the first overlap area to a portion of the second overlap area; and,
    a second seam separate from the first seam and attaching a portion of the first peripheral flange to a portion of the second peripheral flange.

13. The container of claim 12 wherein the first seam comprises a linking section and a bonding section.

14. The container of claim 13 wherein the linking section connects an outer portion of the first overlap area with an outer portion of the second overlap area.

15. The container of claim 13 wherein the bonding section connects an inner portion of the first peripheral flange with an inner portion of the second peripheral flange.

16. The container of claim 13 wherein the linking section and the bonding section each have a thickness wherein the linking section has a greater thickness than the bonding section.

17. The container of claim 16 wherein the linking section has a six-ply thickness and the bonding section has a two-ply thickness.

18. The container of claim 13 wherein the linking section extends at least halfway through the first seam.

19. The container of claim 13 wherein the linking section and the bonding section are of approximately equal lengths.

20. The container of claim 12 wherein the first seam and the second seam are separated by a spacer seam, the spacer seam defining a chamber.

21. The container of claim 20 wherein the chamber extends along the perimeter of the container.

22. The container of claim 12 wherein the first and second substrates are produced from a polymer blend.

23. The container of claim 12 wherein the first and second layers are produced from a polystyrene coextruded on a polymer blend of material.

24. The container of claim 12 wherein the first seam and the second seam extend along the perimeter of the container.

25. A solution container suitable for medical uses comprising:
    a first wall of a first multi-layered polymeric material, the first multi-layered polymeric material having a first substrate and a first layer disposed on a portion of the first substrate to define separately a first overlap area and a first peripheral flange adjacent the first overlap area;
    a second wall of a second multi-layered polymeric material, the second multi-layered polymeric material having a second substrate and a second layer disposed on at least a portion of the second substrate to define separately a second overlap area and a second peripheral flange adjacent the second overlap area;
    a first seam, the first seam comprising a linking section and a bonding section, the linking section securing an outer portion of the first overlap area to an outer portion of the second overlap area, the bonding section securing an inner portion of the first peripheral flange to an inner portion of the second peripheral flange whereby the linking section comprises a four-ply thickness and the bonding section comprises a two-ply thickness;
    a spacer seam, the spacer seam defining a chamber between an intermediate portion of the first peripheral flange and an intermediate portion of the second peripheral flange; and,
    a second seam separated from the first seam by the spacer seam and attaching an outer portion of the first peripheral flange to an outer portion of the second peripheral flange.

26. The container of claim 25 wherein the first seam, the spacer seam, and the second seam extend along the perimeter of the container.

27. The container of claim 25 wherein the linking section extends halfway through the first seam.

28. The container of claim 25 wherein the first substrate and the second substrate are produced from a first polymeric material.

29. The container of claim 25 wherein the first layer and the second layer are produced from a second polymeric material.

30. The container of claim 28 wherein the first polymeric material is a polyolefin.

31. The container of claim 30 wherein the polyolefin is comprised of polypropylene, ultra low density polyethylene, polyamide, and styrene-ethylene-butadiene-styrene.

32. The container of claim 30 wherein the polyolefin comprises polypropylene, ethylene vinyl acetate, and styrene-ethylene-butadiene-styrene.

33. The container of claim 29 wherein the second polymeric material is a polystyrene.

34. The container of claim 25 wherein the first seam and the second seam are formed using heat and compression.

35. The container of claim 34 wherein the heat and compression are applied by a stepped die.

36. A container suitable for medical uses comprising:
a first wall of a first multi-layered polymeric material, the first multi-layered material having a first substrate and a first layer disposed on a portion of the first substrate to define separately a first overlap area and a first peripheral flange adjacent the first overlap area the first layer being disposed within the container;
a second wall of a first polymeric material;
a first seam attaching an inner portion of the first overlap area to the second wall; and,
a second seam spaced from the first seam and attaching an outer portion of the first overlap area to the second wall.

37. A method for sealing polymeric planar members together comprising the steps of:
providing a first planar member having a first layer on a first substrate wherein peripheral edges of the first layer are located inwardly of peripheral edges of the first substrate, the peripheral edges of the first substrate defining a first peripheral flange;
providing a second planar member having a second layer on a second substrate wherein peripheral edges of the second layer are located inwardly of peripheral edges of the second substrate, the peripheral edges of the second substrate defining a second peripheral flange;
positioning the planar members in opposed relation wherein the first layer confronts the second layer to define a first interface area and the first peripheral flange confronts the second peripheral flange to define a second interface area and;
providing a welding apparatus having a die;
placing the first and second interface areas in the welding apparatus;
activating the die to compress the planar members in the interface areas; and,
applying sealing energy through the die forming a welded seam in the first interface area and a welded seam in the second interface area.

38. The method of claim 37 wherein the welding die comprises a first pair of welding dies and a second pair of welding dies, the first interface area positioned between the first welding dies and the second interface area positioned between the second welding dies wherein the step of activating the dies compresses the first interface area to a first compression ratio and compresses the second interface area to a second compression ratio, the first compression ratio being substantially equal to the second compression ratio.

39. The method of claim 38 wherein the welding die comprises a first welding part and a second welding part, each welding part having a first welding die and a second welding die, each first welding die being vertically offset from each second welding die wherein the step of activating the dies compresses the first interface area to a first compression ratio and compresses the second interface area to a second compression ratio, the first compression ratio being substantially equal to the second compression ratio.

40. The method of claim 37 wherein the welding die comprises a first pair of welding dies and a second pair of welding dies, the first interface area positioned between the first pair of welding dies and the second interface area positioned between the second pair of welding dies wherein the first and second layers extend through a portion of the second pair of welding dies.

41. The method of claim 37 wherein the welding die comprises a first pair of welding dies and a second pair of welding dies, the first interface area positioned between the first pair of welding dies and the second interface area positioned between the second pair of welding dies wherein the first and second pairs of welding dies compress the respective interface areas simultaneously.

42. The method of claim 37 wherein the welding die comprises a first pair of welding dies and a second pair of welding dies, the first interface area positioned between the first pair of welding dies and the second interface area positioned between the second pair of welding dies wherein the first and second pairs of welding dies compress the respective interface areas sequentially.

43. A method of making a medical container having opposed walls, the method comprising the steps of:
providing a first wall comprising a first planar member having a first layer on a first substrate wherein peripheral edges of the first layer are located inwardly of peripheral edges of the first substrate, the peripheral edges of the first substrate defining a first peripheral flange;
providing a second wall comprising a second planar member having a second layer on a second substrate wherein peripheral edges of the second layer are located inwardly of peripheral edges of the second substrate, the peripheral edges of the second substrate defining a second peripheral flange;
positioning the walls in opposed relation wherein the first layer confronts the second layer to define a first interface area and the first peripheral flange confronts the second peripheral flange to define a second interface area;
providing a welding apparatus having a die;
placing the first and second interface areas in the welding apparatus;
activating the die to compress the walls in the interface areas; and,
applying sealing energy through the die forming a welded seam in the first interface area and a welded seam in the second interface area.

44. A container suitable for medical uses comprising:
a first wall of a first multi-layered polymeric material, the first multi-layered material having a first substrate and a first layer disposed on a portion of the first substrate to define separately a first overlap area and a first peripheral flange adjacent the first overlap area;
a second wall of a second multi-layered polymeric material, the second multi-layered material having a second substrate and a second layer disposed on at least a portion of the second substrate to define separately a second overlap area and second peripheral flange adjacent the second overlap area;

a first seam attaching a portion of the first overlap area to a portion of the second overlap area, wherein the first seam comprises a linking section and a bonding section; and, a second seam separate from the first seam and attaching a portion of the first peripheral flange to a portion of the second peripheral flange.

45. A container suitable for medical uses comprising:

a first wall of a first multi-layered polymeric material, the first multi-layered material having a first outer substrate and a first inner layer disposed on a portion of the first substrate to define separately a first overlap area and a first peripheral flange adjacent the first overlap area;

a second wall of a first polymeric material;

a first seam attaching a portion of the first inner layer to the second wall; and, a second seam spaced from the first seam and attaching a portion of the first wall peripheral flange to the second wall.

46. A container suitable for medical uses comprising:

a first wall of a first multi-layered polymeric material, the first multi-layered material having a first substrate and a first layer disposed on a portion of the first substrate to define separately a first overlap area and a first peripheral flange adjacent the first overlap area;

a second wall of a second multi-layered polymeric material, the second multi-layered material having a second substrate and a second layer disposed on at least a portion of the second substrate to define separately a second overlap area and second peripheral flange adjacent the second overlap area;

a first seam attaching a portion of the first overlap area to a portion of the second overlap area, wherein the first layer confronts the second layer defining an interior of the container; and, a second seam separate from the first seam and attaching a portion of the first peripheral flange to a portion of the second peripheral flange.

47. A container suitable for medical uses comprising:

a first wall of a first multi-layered polymeric material, the first multi-layered material having a first outer substrate and a first inner layer disposed on a portion of the first substrate to define separately a first overlap area and a first peripheral flange adjacent the first overlap area;

a second wall of a first polymeric material;

a first seam attaching a portion of the first overlap area to the second wall wherein the first outer substrate defines an outermost peripheral edge of the container; and, a second seam spaced from the first seam and attaching a portion of the first wall peripheral flange to the second wall.

48. A container suitable for medical uses comprising:

a first wall of a first multi-layered polymeric material, the first multi-layered material having a first substrate and a first layer disposed on a portion of the first substrate to define separately a first overlap area and a first peripheral flange adjacent the first overlap area, the first layer defining a noncontinuous inner surface and the first substrate defining a continuous outer surface;

a second wall of a first polymeric material;

a first seam attaching a portion of the first overlap area to the second wall; and, a second seam spaced from the first seam and attaching a portion of the first wall peripheral flange to the second wall.

49. A container suitable for medical uses comprising:

a first wall of a first multi-layered polymeric material, the first multi-layered material having a first substrate and a first layer disposed on a portion of the first substrate to define separately a first overlap area and a first peripheral flange adjacent the first overlap area;

a second wall of a first polymeric material;

a first seam attaching a portion of the first overlap area to the second wall, the first seam extending around substantially an entire periphery of the container; and, a second seam spaced from the first seam and attaching a portion of the first wall peripheral flange to the second wall, the second seam extending around substantially an entire periphery of the container.

* * * * *

UNITED STATES PATENT AND TRADEMARK OFFICE
CERTIFICATE OF CORRECTION

PATENT NO.   : 6,083,584
DATED        : July 4, 2000
INVENTOR(S)  : Sidney T. Smith and Steven H. Giovanetto It is certified that error appears in the above-identified patent and that said Letters Patent is hereby corrected as shown below:

Column 8,
Line 36, delete "," and insert therefor -- $_{12}$ --
Line 37, delete "P" and insert therefor -- F --
Line 58, after "also" insert -- be --

Column 9,
Line 14, delete "PL-732°" and insert therefor -- PL-732® --
Line 15, delete "PL-732°" and insert therefor -- PL-732® --
Line 18, delete "PL-732°" and insert therefor -- PL-732® --
Line 19, delete "PL-732°" and insert therefor -- PL-732® --
Line 36, delete "PL-732°" and insert therefor -- PL-732® --

Column 12,
Line 15, before "10" insert -- 0. --

Column 15,
Line 53, after "area" insert -- , --

Signed and Sealed this

Twenty-fifth Day of September, 2001

Attest:

NICHOLAS P. GODICI
Attesting Officer    Acting Director of the United States Patent and Trademark Office